Figure 1:
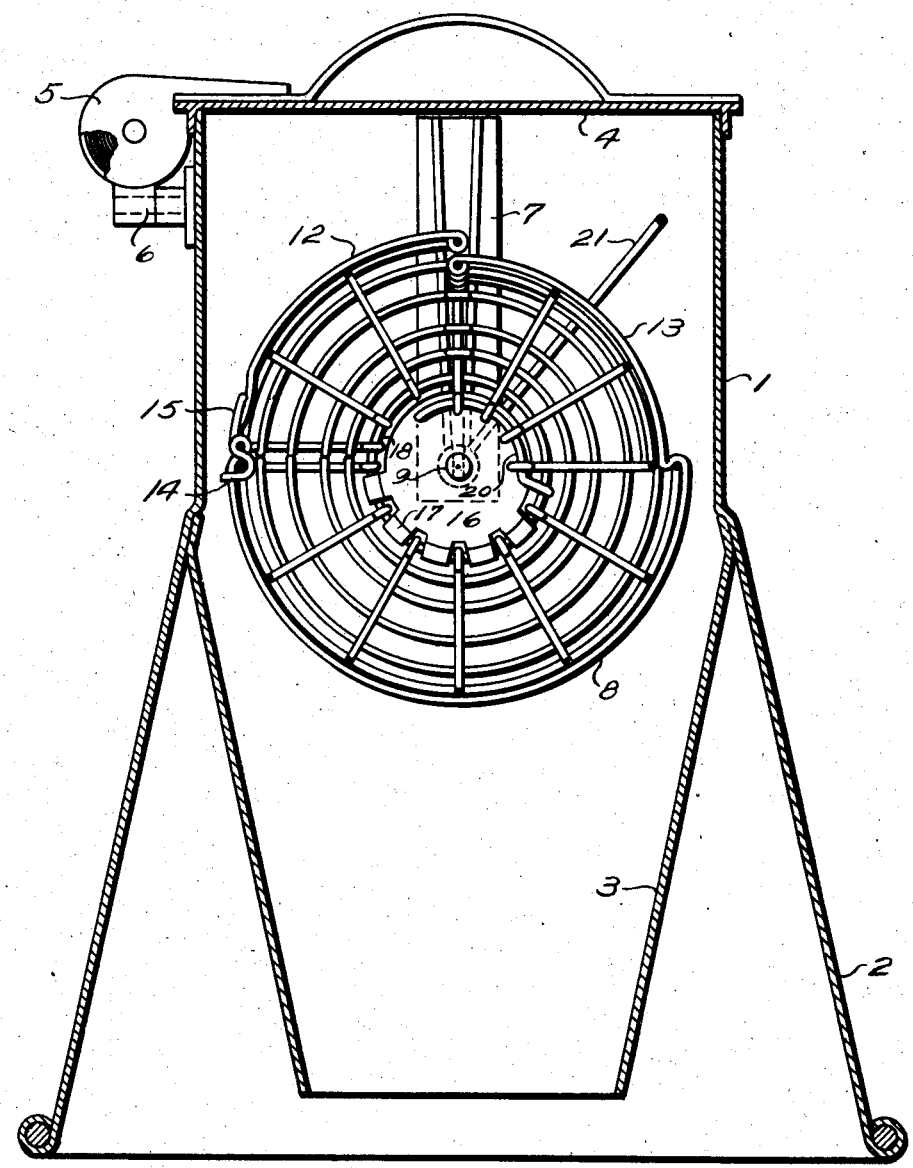

No. 834,915. PATENTED NOV. 6, 1906.
J. LANG.
ASH SIFTER.
APPLICATION FILED AUG. 7, 1905.

2 SHEETS—SHEET 1.

Witnesses:
Andrew Rummler
Glen C. Stephens

Inventor,
Jules Lang
by Rummler & Rummler
Attorneys.

No. 834,915. PATENTED NOV. 6, 1906.
J. LANG.
ASH SIFTER.
APPLICATION FILED AUG. 7, 1905.
2 SHEETS—SHEET 2.
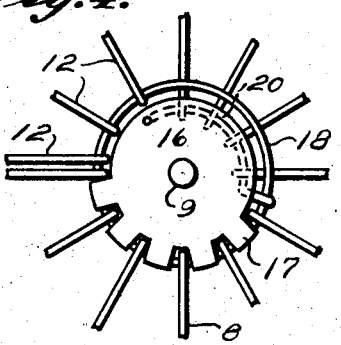
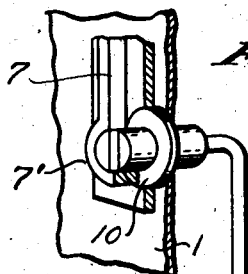
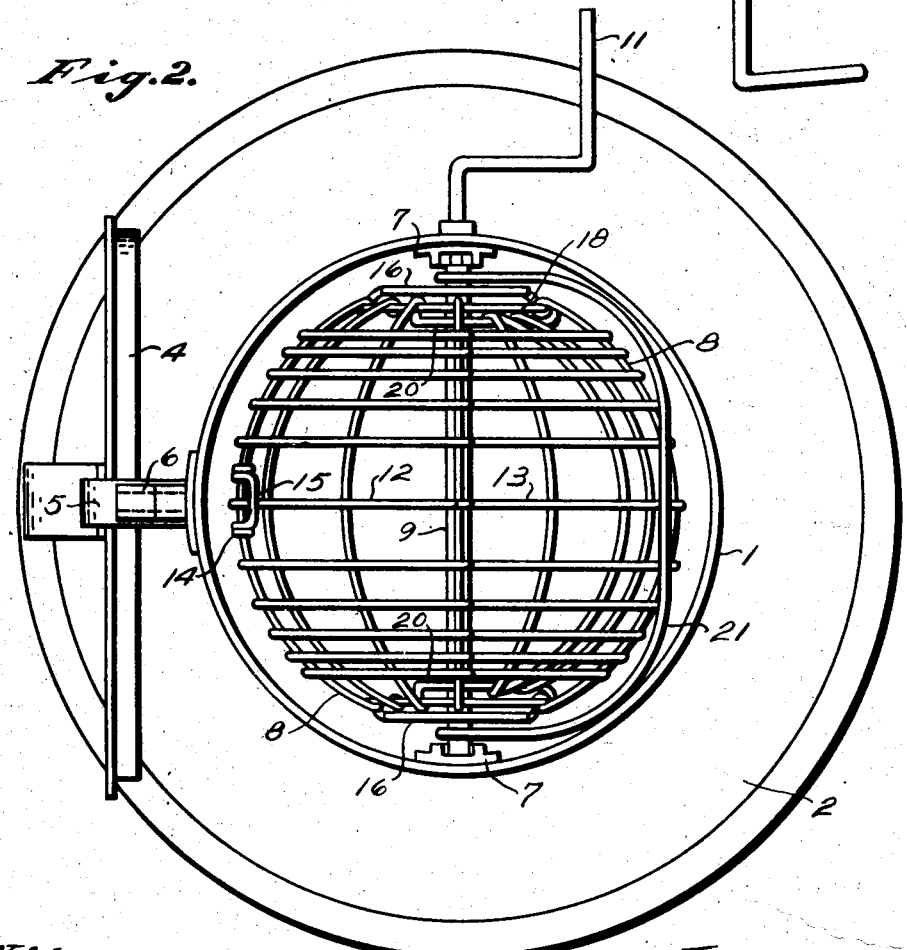

UNITED STATES PATENT OFFICE.

JULES LANG, OF CHICAGO, ILLINOIS.

ASH-SIFTER.

No. 834,915.  Specification of Letters Patent.  Patented Nov. 6, 1906.

Application filed August 7, 1905. Serial No. 273,072.

*To all whom it may concern:*

Be it known that I, JULES LANG, a citizen of France, and a resident of Chicago, in the county of Cook and State of Illinois, have invented certain new and useful Improvements in Ash-Sifters, of which the following is a specification.

This invention relates to devices for sifting ashes.

The main objects of this invention are to provide an improved form of rotating ash-sifter, to provide a form of casing for ash-sifters which is adapted to fit tightly upon the rim of a circular receptacle and which without adjustment will fit receptacles of a plurality of different diameters, and to provide an improved construction for devices of this kind whereby the rotating screen may be readily filled and may be easily removed from the casing for emptying it.

I accomplish these objects by the device shown in the accompanying drawings, in which—

Figure 1 is a vertical section of an ash-sifter constructed according to my invention. Fig. 2 is a top plan of the same with the lid in its open position. Fig. 3 is a detail in perspective and partly broken away, showing the socket member at the inner end of the operating-crank and showing the method of mounting the same in one of the bearings of the screen. Fig. 4 is an end elevation of the screen, showing the method of mounting the movable segment 12.

In the construction shown in the drawings the casing 1 consists of a hollow cylindrical body part supported by a downwardly and outwardly flared conical apron 2 and also provided within the apron 2 with a downwardly-converging conical hopper 3. The casing is closed at its upper end by means of a lid 4, which is preferably hinged at one end by means of a spring-hinge 5, having swiveled connection at 6 with the casing. This spring-hinge normally urges the lid into its closed position, and the swivel permits the lid to be swung toward one side and hang downwardly against the side of the casing, as indicated in Fig. 2. Guide members 7 are secured at opposite sides of the interior of the body part of the casing 1. These guide members are preferably U-shaped and form bearings at their lower ends for supporting the axle of the screen 8.

The screen 8 is preferably circular in transverse cross-section and is provided with an axle 9, which extends through the same to form trunnions for supporting the same in a horizontal position, said axle being adapted to rest in the bearings 7' at the lower ends of the members 7. These bearings open upwardly, so as to permit the screen to be readily lifted therefrom and removed from the casing. One of the bearings, 7', has a socket member 10, journaled at its lower end. This socket member extends through the adjacent wall of the casing and is connected with a crank 11, whereby said socket member 10 may be rotated. One end of the axle 9 of the screen is squared or flattened and fits a recess in the socket member 10 in such manner that when the squared end of the axle 9 is seated in said recess the rotation of the crank will cause the screen to rotate. The upwardly-extending side parts of the members 7 serve as a guide for directing the axle toward the bearings when the screen is placed within the casing. As seen in Fig. 3, the recess in the socket member 10 corresponds in width with the channel in the corresponding guide member 7, so that the squared part of the axle 9 will be guided to its seat in said recess by the sides of said guide member.

The screen 8 is spherical in shape and one segment 12 thereof is of larger diameter than the adjacent segment 13 and is arranged to slide over the segment 13, serving as a door to permit ashes to be filled in and removed from the screen. The clasp 14 secures the door in its closed position. By swinging the handle 15 outwardly the clasp 14 is released. The spherical screen is secured to its axle 9 by means of a sheet-metal disk 16 at each end. The disks 16 are rigidly connected to the axle 9 and are provided with radially-disposed lugs 17, which secure said disk to the end rings 18 of the screen structure. The movable segment 12 is mounted so as to slide on said end rings 18. The ends of the segment 13 (which is of reduced diameter to permit the segment 12 to slide over the same) are secured to wires 20, fastened to the inner face of the disks 16. The handle 21, by means of which the screen may be lifted from the casing, consists of a wire having its ends wound around the axle 9 at each end of the casing. The handle 21 normally lies against the inner wall of the casing 1, and as it is loosely mounted on the axle 9 offers no resistance to the free rotation of the screen.

The operation of the device shown is as follows: The walls of the conical apron and hopper at the lower end of the casing are concentrically arranged and meet each other at an acute angle, being particularly adapted for mounting the same upon the rims of circular receptacles, such as a barrel. When the casing is placed over the rim of such circular receptacle and pressed downward, it will wedge itself tightly upon such rim. If the receptacle is small in size, the hopper 3 will engage the rim, and if it is large its rim will be engaged by the apron 2. It will thus be seen that the device will fit any receptacle having a circular rim of a diameter intermediate between the smallest diameter of the hopper and the largest diameter of the apron.

To fill the basket or screen with ashes, the lid 4 is lifted from the casing and allowed to swing down on its swivel 6. The basket is then turned to bring the movable segment 12 of the basket uppermost and the basket is opened by raising the handle 15 and then drawing the movable segment toward the right of Fig. 1. Ashes are then filled into the basket and the door is closed. By turning the crank 11 the basket is caused to rotate and its contents are thoroughly sifted. The entire basket may then be lifted by means of the handle 21 and the coal remaining in the basket may then be emptied therefrom. The recess in the socket-piece 10 is preferably of such form and so located with respect to the crank that when said crank hangs in a downward position the recess will be suitably disposed to permit the square end of the axle 9 to enter or be withdrawn therefrom in a vertical direction, and the flattening of the axle is also so disposed as to bring the door of the basket uppermost when the crank hangs down. The spherical form of the screen 8 permits the ashes to rapidly sift off on all sides.

During the sifting of ashes the lid 4 is of course closed and is securely held in a closed position by the spring-hinge 5. This hinge also has the effect of causing the cover to assume a properly-closed position when the same has been carelessly closed. Other features of the operation of the device shown will be readily understood from the drawings.

What I claim as my invention, and desire to secure by Letters Patent, is—

1. An ash-sifter comprising a casing, a conical hopper at the lower end of said casing for discharging the contents thereof, and a conical apron surrounding said hopper, the walls of said hopper converging downward and those of said apron diverging downward, the space between said walls being many times wider at their lower ends than at their upper ends so as to adapt the device to fit barrels of different diameters through contact with either of said walls.

2. In an ash-sifter, the combination of a casing open at the top, an annular screen within said casing and having trunnions at opposite ends thereof, a bearing mounted on one side of said casing and being open upward for supporting one of the trunnions, the other trunnion being squared or flattened at its end, a crank journaled in said casing adjacent to said other trunnion and having a transverse slot in its end fitting the squared or flattened part of said trunnion, a bearing adapted to support said other trunnion when in engagement with said crank, said trunnions being adapted to be lifted out of their bearings to permit the removal of said screen from the casing, and a guide on said casing for directing the squared or flattened trunnion toward the slot in said crank.

Signed at Chicago this 31st day of July, 1905.

JULES LANG.

Witnesses:
EUGENE A. RUMMLER,
GLEN C. STEPHENS.